United States Patent
Yoshinaga

(10) Patent No.: US 10,532,400 B2
(45) Date of Patent: Jan. 14, 2020

(54) ASSEMBLY SYSTEM, ASSEMBLING METHOD, AND ASSEMBLY UNIT

(71) Applicant: FANUC CORPORATION, Yamanashi (JP)

(72) Inventor: Toshimichi Yoshinaga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 86 days.

(21) Appl. No.: 15/869,180

(22) Filed: Jan. 12, 2018

(65) Prior Publication Data

US 2018/0207718 A1 Jul. 26, 2018

(30) Foreign Application Priority Data

Jan. 26, 2017 (JP) .................................. 2017-012383

(51) Int. Cl.
*B22D 17/20* (2006.01)
*B25J 9/16* (2006.01)
*B22D 17/00* (2006.01)

(52) U.S. Cl.
CPC ....... *B22D 17/2084* (2013.01); *B22D 17/002* (2013.01); *B25J 9/1687* (2013.01); *G05B 2219/45064* (2013.01)

(58) Field of Classification Search
CPC .. B22D 17/2084; B22D 17/002; B25J 9/1687; G05B 2219/45064
See application file for complete search history.

(56) References Cited

U.S. PATENT DOCUMENTS

| 7,168,149 B2 | 1/2007 | Kalemba et al. |
| 2015/0314502 A1 | 11/2015 | Stoelben et al. |
| 2016/0221070 A1* | 8/2016 | Gaudin ................. B22C 9/065 |

FOREIGN PATENT DOCUMENTS

| CN | 1681638 A | 10/2005 |
| CN | 103538071 A | 1/2014 |
| CN | 205112232 U | 3/2016 |
| CN | 105583385 A | 5/2016 |
| EP | 0911104 A1 | 4/1999 |
| EP | 2017058 A2 | 1/2009 |
| JP | 58165981 A | 10/1983 |
| JP | 3130122 A | 6/1991 |
| JP | 4175124 A | 6/1992 |

(Continued)

OTHER PUBLICATIONS

English Abstract and Machine Translation for Japanese Publication No. JPH03-130122 A, published Jun. 3, 1991, 7 pgs.

(Continued)

*Primary Examiner* — John C Hong
(74) *Attorney, Agent, or Firm* — Fredrikson & Byron, P.A.

(57) ABSTRACT

An assembly system includes a molding machine that molds first parts and second parts and a robot having an assembly unit including a first holder that holds the first parts and a second holder that holds the second parts with each other. The first parts and the second parts that are molded by the molding machine are removed from the mold while being held by the first holder and the second holder of the robot. At least one of the first holder and the second holder is moved relative to the other so as to assemble the first parts and the second parts without releasing the first parts held by the first holder and the second parts held by the second holder.

6 Claims, 11 Drawing Sheets

(56) References Cited

FOREIGN PATENT DOCUMENTS

| | | | |
|---|---|---|---|
| JP | 6106544 | A | 4/1994 |
| JP | 9123232 | A | 5/1997 |
| JP | 2000238090 | A | 9/2000 |
| JP | 2002225065 | A | 8/2002 |
| JP | 2008114532 | A | 5/2008 |
| KR | 1020090061370 | A | 6/2009 |

OTHER PUBLICATIONS

English Abstract and Machine Translation for Japanese Publication No. JPH09-123232 A, published May 13, 1997, 25 pgs.
English Abstract and Machine Translation for Japanese Publication No. 2000-238090 A, published Sep. 5, 2000, 19 pgs.
English Abstract and Machine Translation for Japanese Publication No. JPH04-175124 A, published Jun. 23, 1992, 6 pgs.
English Abstract and Machine Translation for Japanese Publication No. JPH06-106544 A, published Apr. 19, 1994, 7 pgs.
English Abstract and Machine Translation for Chinese Publication No. 205112232 U, published Mar. 30, 2016, 7 pgs.
English Abstract and Machine Translation for Chinese Publication No. 1681638 A, published Oct. 12, 2005, 25 pgs.
English Abstract and Machine Translation for Chinese Publication No. 103538071 A, published Jan. 29, 2014, 5 pgs.
English Abstract and Machine Translation for Chinese Publication No. 105583385 A, published May 18, 2016, 7 pgs.
English Abstract and Machine Translation for Korean Publication No. 20090061370 A, published Jun. 16, 2009, 5 pgs.
Untranslated Decision to Grant issued by Japan Patent Office (JPO) dated Dec. 18, 2018 in corresponding JP Application No. 2017-012383, 3 pgs.
English Machine Translation of Decision to Grant issued by Japan Patent Office (JPO) dated Dec. 18, 2018 in corresponding JP Application No. 2017-012383, 3 pgs.
Untranslated Decision of Refusal issued by Japan Patent Office (JPO) on Oct. 9, 2018 in corresponding JP Application No. 2017-012383, 2 pgs.
English Machine Translation of Decision of Refusal issued by Japan Patent Office (JPO) dated Oct. 9, 2018 in corresponding JP Application No. 2017-012383, 2 pgs.
Untranslated Decision of Notification of Reasons for Refusal issued by Japan Patent Office (JPO) dated Jul. 10, 2018 in corresponding JP Application No. 2017-012383, 3 pgs.
English Machine Translation of Decision of Notification of Reasons for Refusal issued by Japan Patent Office (JPO) dated Jul. 10, 2018 in corresponding JP Application No. 2017-012383, 3 pgs.
English Abstract and Machine Translation for Japanese Publication No. 2008-114532 A, published May 22, 2008, 14 pgs.
English Abstract and Machine Translation for Japanese Publication No. 2002-225065 A, published Aug. 14, 2002, 17 pgs.
English Machine Translation for Japanese Publication No. JPS58165981 A, published Oct. 1, 1983, 5 pgs.

* cited by examiner

ASSEMBLY SYSTEM, ASSEMBLING METHOD, AND ASSEMBLY UNIT

BACKGROUND OF THE INVENTION

1. Field of the Invention

The present invention relates to an assembly system, an assembling method, and an assembly unit.

2. Description of the Related Art

Kinds of parts or moldings that can be assembled with one another are simultaneously molded in the molds of a molding machine. Japanese Unexamined Patent Publication (Kokai) No. 2002-225065 describes "a molding/assembling apparatus that includes molding removing means that removes a molding from a mold opened by mold opening/closing means and transfers the removed molding, and molding assembling means that assembles moldings transferred by the molding removing means."

Japanese Unexamined Patent Publication (Kokai) No. 2008-114532 discloses "an article removing robot (article removing machine) that includes two molding chuck units provided on an arm so as to simultaneously remove moldings from two molds."

Moreover, Japanese Unexamined Patent Publication (Kokai) No. 58-165981 discloses that "a first part is supplied to a predetermined position by one manipulator and is continuously held to be fixed at the predetermined position, and in this state, a second part is supplied to the predetermined position of the first part and is assembled to the first part by the other manipulator."

SUMMARY OF THE INVENTION

The configuration of Japanese Unexamined Patent Publication (Kokai) No. 2002-225065 requires both of the part removing means and the part assembling means. The configuration of Japanese Unexamined Patent Publication (Kokai) No. 2008-114532 further requires means for assembling parts removed by a robot. The configuration of Japanese Unexamined Patent Publication (Kokai) No. 58-165981 requires the two manipulators.

If both the part removing means and the part assembling means are necessary, a positioning mechanism is required for positioning a removed part to a predetermined position, and a position sensor is required for detecting a position.

It has been desired to provide an assembly system, an assembling method, and an assembly unit that can remove and assemble parts with a simple configuration.

An aspect of the present disclosure provides an assembly system including: a molding machine that molds first parts and second parts in the same mold so as to assemble the first parts and the second parts with each other; and a robot that removes the first parts and the second parts from the mold after the first parts and the second parts are molded by the molding machine, and assembles the removed first parts and second parts without releasing the first parts and the second parts.

Another aspect of the present disclosure provides an assembling method including the steps of: molding first parts and second parts in the same mold of a molding machine so as to assemble the first parts and the second parts with each other; removing the first parts and the second parts from the mold by a robot; and assembling the removed first parts and second parts by the robot without releasing the first parts and the second parts.

Another aspect of the present disclosure provides an assembly unit including a first holder that holds first parts molded in a mold of a molding machine; a second holder that holds second parts molded with the first parts in the mold of the molding machine so as to be assembled with the first parts; and a moving mechanism that relatively moves the first holder and the second holder so as to assemble the first parts and the second parts without releasing the first parts held by the first holder and the second parts held by the second holder.

In the aspect, the robot simultaneously removes the first parts and the second parts from the mold and assembles the first parts and the second parts without releasing the first parts and the second parts. Thus, the parts can be removed and assembled with a simple configuration. Moreover, the robot can assemble the removed first parts and second parts while transferring the first parts and the second parts, thereby shortening cycle time.

In another aspect, the moving mechanism of the assembly unit relatively moves the first holder that holds the first parts and the second holder that holds the second parts so as to assemble the first parts and the second parts. Thus, the parts can be removed and assembled with a simple configuration.

A detailed description about a typical embodiment of the present invention shown in the accompanying drawings further clarifies the object, characteristics, advantages of the present invention and other objects, characteristics, and advantages of the present invention.

DETAILED DESCRIPTION

Embodiments of the present invention will be described below with reference to the accompanying drawings. In the following drawings, the same members are indicated by the same reference symbols. To enhance understanding, the scales of the drawings are optionally changed.

Figure 1:
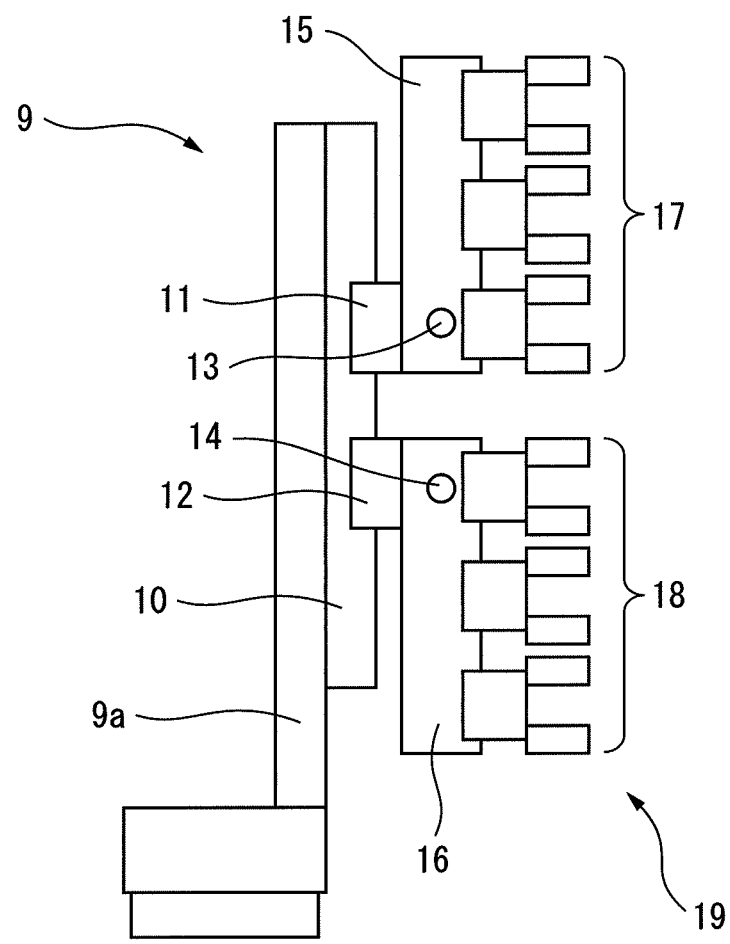
FIG. 1 is a top view of an assembly unit according to a first embodiment.

FIG. 1 is a top view of an assembly unit according to a first embodiment. A rail 10 is disposed along an extended body 9a of an assembly unit 9. Moreover, a first sliding part 11 and a second sliding part 12 are slidably disposed on the rail 10.

The first sliding part 11 is connected to one end of a first support part 15 via a first rotating part 13. Similarly, the second sliding part 12 is connected to one end of a second support part 16 via a second rotating part 14. In FIG. 1, the first sliding part 11 and the second sliding part 12 are placed substantially at the center of the rail 10. Thus, the first sliding part 11 and the second sliding part 12 can slide so as to be away from each other.

The first support part 15 includes at least one first holder 17 that grips first parts 31 molded by a mold 21, which will be discussed later. The second support part 16 includes at least one second holder 18 that grips second parts 32 molded by the same mold 21 concurrently with the first parts 31. As shown in FIG. 1, the at least one first holder 17 and the at least one second holder 18 are preferably arranged on the same straight line.

The number of first holders 17 and the number of second holders 18 vary depending on the number of first parts 31 and the number of second parts 32 that are simultaneously molded by the same mold 21. In the state shown in FIG. 1, the distance between the first holders 17, the distance between the second holders 18, and the distance between the first support part 15 and the second support part 16 are determined according to the dimensions of the mold 21 for molding the at least one first part 31 and the at least one second part 32. In the following explanation, a plurality of first parts 31, for example three first parts 31, and a plurality of second parts 32, for example three second parts 32, are molded in the mold 21. The assembly unit 9 includes a plurality of first holders 17, for example three first holders 17, and a plurality of second holders 18, for example three second holders 18.

the first holders 17 and the second holders 18 are preferably opening/closing grippers. In this case, it is not necessary to consider positional errors of the first parts 31 and the second parts 32 when the first parts 31 and the second parts 32 are held by the first holders 17 and the second holders 18. Alternatively, the first holders 17 and the second holders 18 may be suction chucks.

If the first parts 31 and the second parts 32 are molded with magnetic resin or the first parts 31 and the second parts 32 include metal parts through insert molding, the first holders 17 and the second holders 18 may be made of electromagnets.

Figure 2:
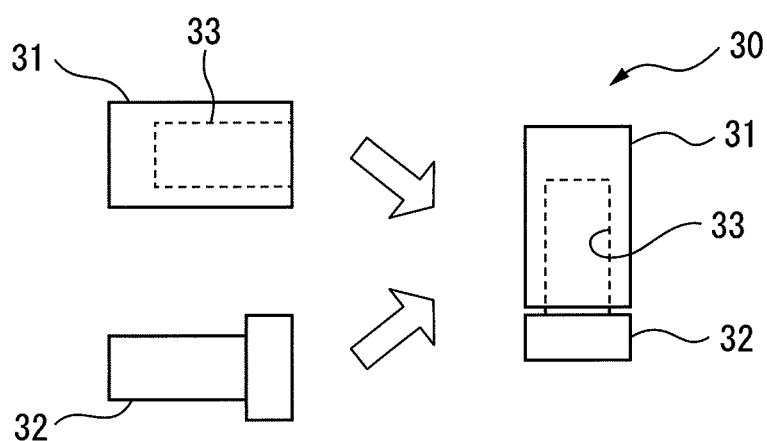
FIG. 2 shows an example of a first part and a second part.

FIG. 2 shows an example of the first part and the second part. In FIG. 2, the first part 31 is a substantially cylindrical member including a recess part 33 formed on one end face of the first part 31, and the second part 32 is an extended member that can be fit into the recess part 33. In this way, the first part 31 and the second part 32 can be assembled with each other. The second part 32 is inserted into the recess part 33 of the first part 31 so as to create an assembly 30. The first part 31 and the second part 32 may have other shapes that can be assembled with each other.

The rail 10, the first sliding part 11, the second sliding part 12, the first rotating part 13, the second rotating part 14, the first support part 15, and the second support part 16 act as a moving mechanism 19 that relatively moves the first holders 17 and the second holders 18 so as to assemble the first parts 31 held by the first holders 17 and the second parts 32 held by the second holders 18 with each other.

Figure 3:
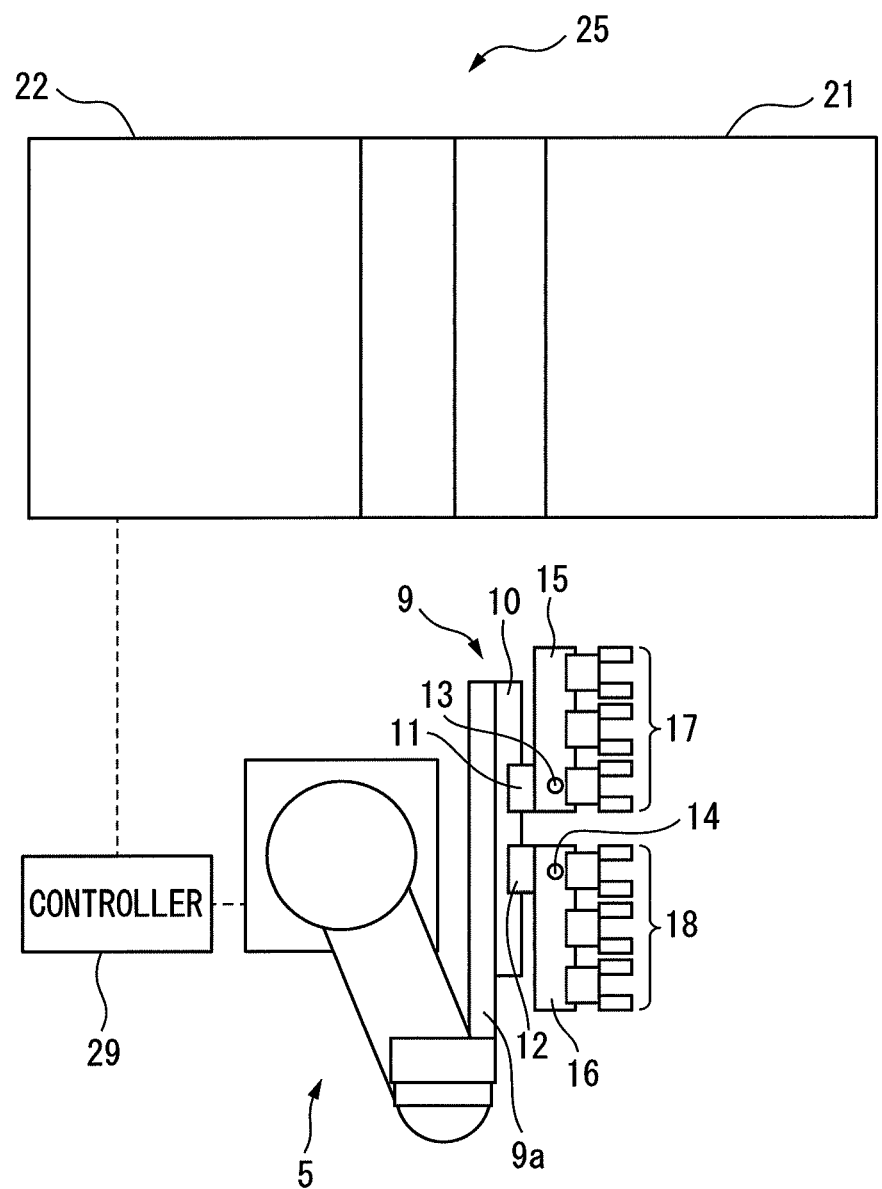
FIG. 3 is a schematic diagram of an assembly system that includes the assembly unit shown in FIG. 1.

FIG. 3 is a schematic diagram of an assembly system that includes the assembly unit shown in FIG. 1. An assembly system 1 includes a molding machine 25. The molding machine 25 is, for example, an injection molding machine. As described above, the molding machine 25 may be an insert-molding machine. The molding machine 25 includes a pair of molds 20 made up of the movable first mold 21 and a fixed second mold 22. When the first mold 21 is opened after molding, the first parts 31 and the second parts 32 are held in the first mold 21.

The assembly system 1 further includes a robot 5, e.g., a six-axis articulated robot, provided with the assembly unit 9 on the distal end of the robot. The robot 5 has the function of simultaneously removing the first parts 31 and the second parts 32, which are molded by the molding machine 25, and assembling the removed first parts 31 and second parts 32. The molding machine 25 is connected to a controller 29 that controls the robot 5.

Figure 4:
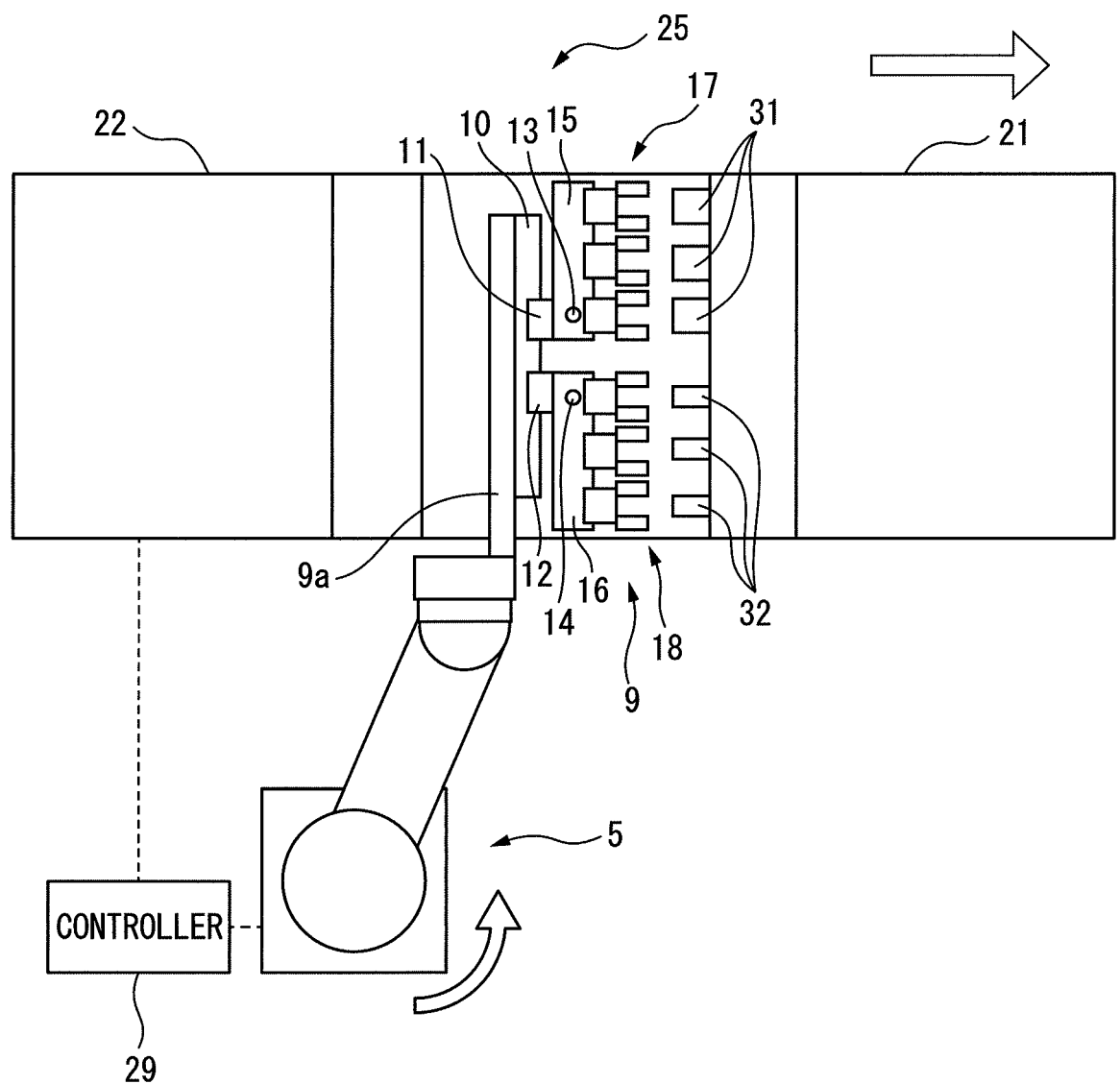
FIG. 4 is another schematic diagram showing the assembly system of FIG. 3.

FIG. 4 is another schematic diagram showing the assembly system of FIG. 3. In FIG. 4, the first mold 21 of the molding machine 25 is opened. The first parts 31 and the second parts 32, which are molded by the molding machine 25, remain held at predetermined positions on the first mold 21. The positional relationship between the first parts 31 and the second parts 32 on the first mold 21 is determined according to the dimensions of the first mold 21. Thus, the positional relationship between the first parts 31 and the second parts 32 on the first mold 21 is identified beforehand. In FIG. 4, the end faces, opposite to the end faces where the recess parts 33 are formed, of the first parts 31 held by the first mold 21 are exposed and the portions, opposite to portions engaged with the recess parts 33, of the second parts 32 are exposed.

When the first mold 21 is opened, the first parts 31 and the second parts 32 are not held by the second mold 22. Moreover, when the first mold 21 is opened, the space between the first mold 21 and the second mold 22 is large enough to allow the entry of the assembly unit 9 provided on the robot 5.

Figure 5:
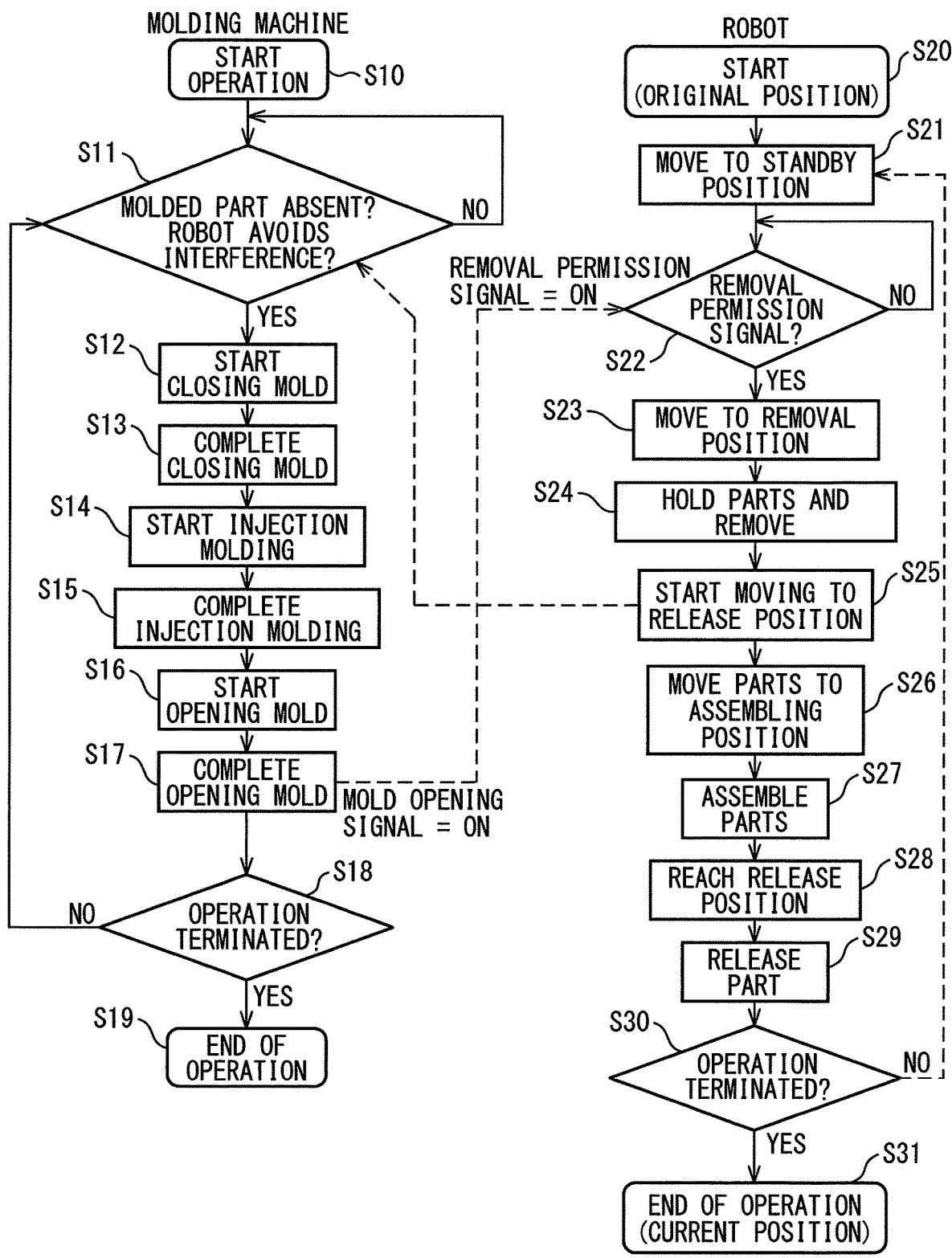
FIG. 5 is a flowchart showing the operations of the assembly system.

FIG. 5 is a flowchart showing the operations of the assembly system. FIGS. 6A to 6F show the states of the assembly unit. Referring to FIGS. 1 to 6F, the operations of the assembly system 1 will be described below. In the following explanation, the molding machine 25 is an injection molding machine.

First, in step S10, the molding machine 25 is started and then the robot 5 is activated in step S20. The robot 5 is then moved to a standby position where the robot 5 does not interfere with the molding machine 25 (Step S21). The standby position is, for example, the position of the robot 5 shown in FIG. 3.

Subsequently, in step S11, the controller 29 determines whether or not the first parts 31 and the second parts 32 exist in the first mold 21 and the second mold 22 of the molding machine 25 and determines whether the robot 5 is positioned so as to avoid interference with the molding machine 25. If both cases are determined as YES, the process advances to step S12. If only one of the cases is determined as NO, the process does not advance to step S12.

In step S12, the first mold 21 is moved toward the second mold 22 in a mold closing direction so as to start closing the molding machine 25. When the molding machine 25 is closed completely in step S13, injection molding is started in step S14. After the completion of injection molding in step S15, the first mold 21 is moved from the second mold 22 in a mold opening direction in step S16 and then the first mold 21 reaches an opening position shown in FIG. 4 in step S17. After that, it is determined whether the operation of the molding machine 25 should be terminated or not. In the case of YES, the operation of the molding machine 25 is terminated (steps S18 and S19).

In step S17, when the first mold 21 reaches the opening position, the controller 29 of the robot 5 is notified of a mold opening signal from the molding machine 25. When the mold opening signal is inputted to the controller 29, the controller 29 outputs a removal permission signal to the robot 5. In step S22, if it is determined that the removal permission signal has been outputted, the process advances to step S23.

In step S23, the robot 5 moves the assembly unit 9 to a removal position shown in FIG. 4. At the removal position, a plurality of the first holders 17 and a plurality of the second holders 18 of the assembly unit 9 face a plurality of the first parts 31 and a plurality of the second parts 32 of the first mold 21, respectively. Subsequently, in step S24, the robot 5 moves the assembly unit 9 toward the first mold 21 in the mold opening direction.

Figure 6A:
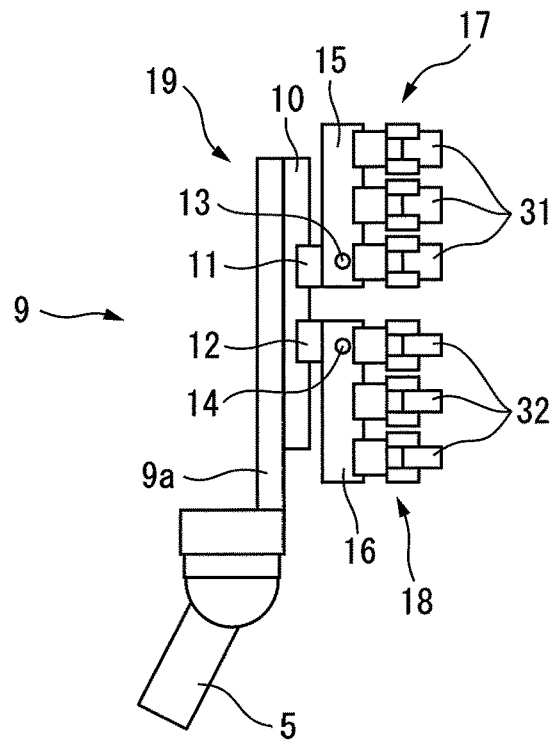
FIG. 6A shows a first state of the assembly unit.

Subsequently, as shown in FIG. 6A, the first holders 17 and the second holders 18 respectively hold the first parts 31 and the second parts 32 of the first mold 21. The robot 5 then moves the assembly unit 9 in the mold closing direction so as to simultaneously remove a plurality of the first parts 31 and a plurality of the second parts 32 from the first mold 21. When the assembly unit 9 returns to the removal position, the robot 5 holding the first parts 31 and the second parts 32 starts moving the assembly unit 9 to a release position (not shown) (step S25).

While moving to the release position, the assembly unit 9 moves the first parts 31 and the second parts 32 to an assembling position (step S26) and assembles them (step S27).

Figure 6B:
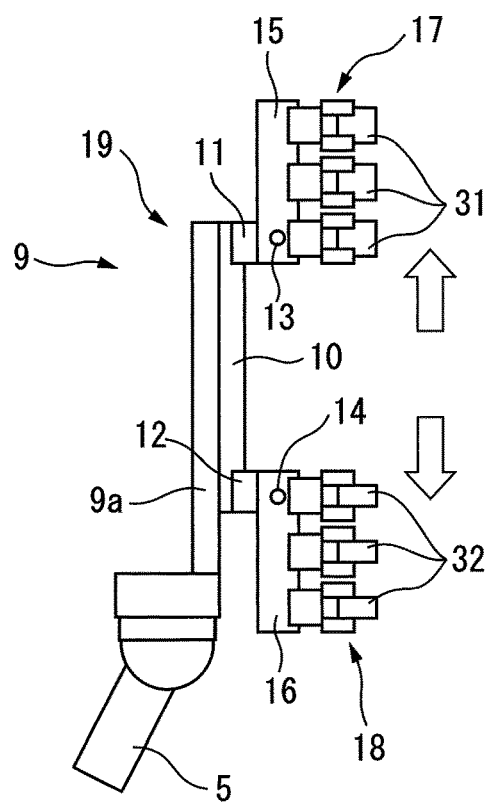
FIG. 6B shows a second state of the assembly unit.
Figure 6C:
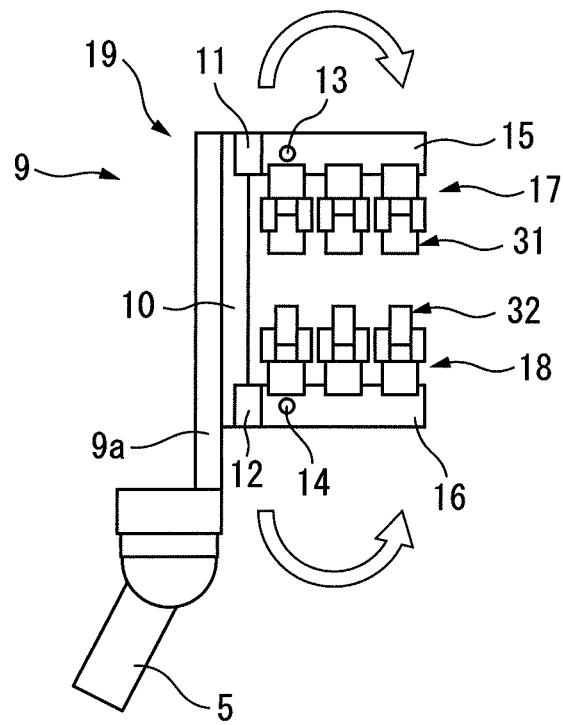
FIG. 6C shows a third state of the assembly unit.

Specifically, as shown in FIG. 6B, the first sliding part 11 and the second sliding part 12 slide so as to be away from each other on the rail 10. After that, as shown in FIG. 6C, the first support part 15 and the second support part 16 pivot about the first rotating part 13 and the second rotating part 14, respectively, only by about 90°. Thus, a plurality of the first parts 31 held by the first holders 17 and a plurality of the second parts 32 held by the second holders 18 face each other. The first parts 31 and the second parts 32 in FIG. 6C are located at the assembling position.

Figure 6D:
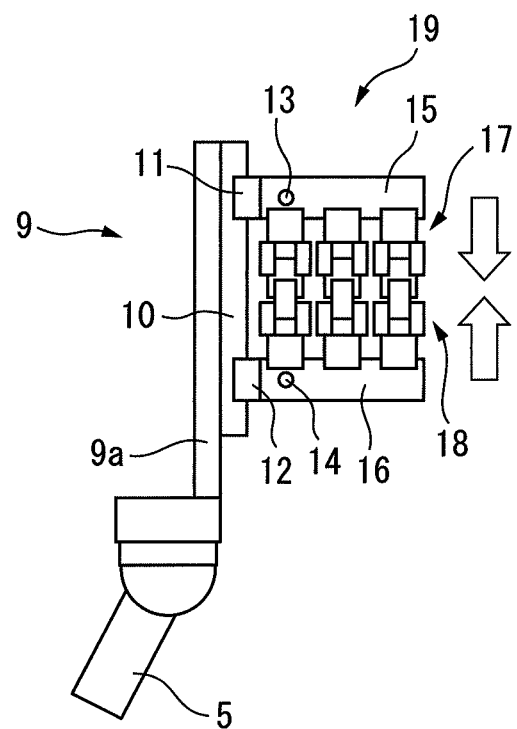
FIG. 6D shows a fourth state of the assembly unit.

Subsequently, as shown in FIG. 6D, at least one of the first sliding part 11 and the second sliding part 12 is moved to the other. This partially inserts the second parts 32 into the recess parts of the first parts 31 and assembles the first parts 31 and the second parts 32 so as to simultaneously create a plurality of the assemblies 30. The second holders 18 are then opened so as to release the second parts 32.

Figure 6E:
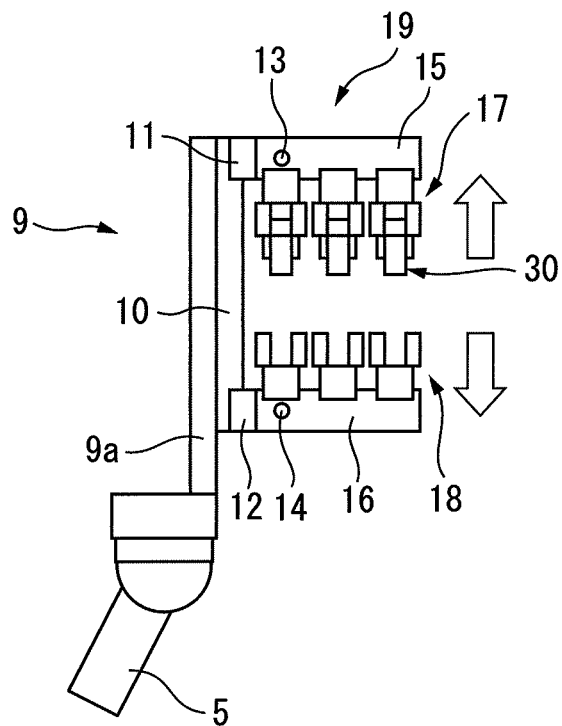
FIG. 6E shows a fifth state of the assembly unit.
Figure 6F:
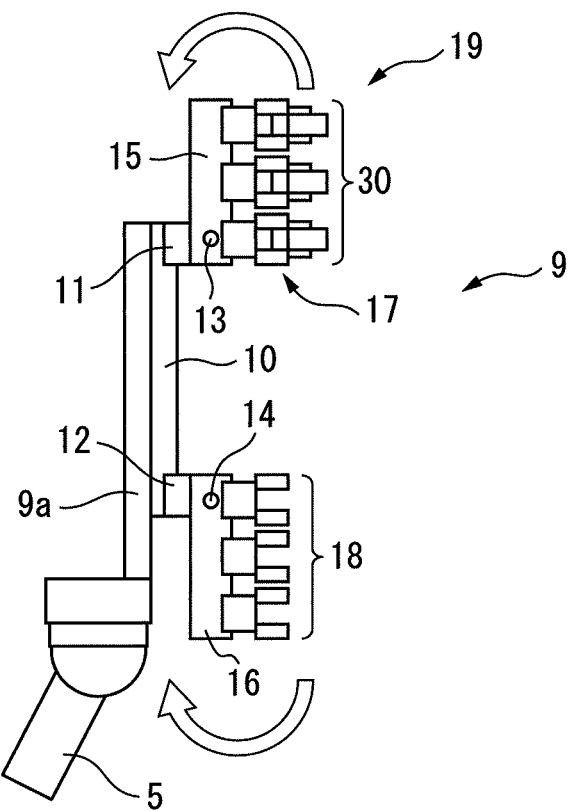
FIG. 6F shows a sixth state of the assembly unit.

As shown in FIG. 6E, the first sliding part 11 and the second sliding part 12 are slid so as to be away from each other, allowing only the first holder 17 to hold the assemblies 30. Subsequently, as shown in FIG. 6F, the first support part 15 and the second support part 16 are reversely pivoted about the first rotating part 13 and the second rotating part 14, respectively, by 90°. After that, the first sliding part 11 and the second sliding part 12 may be slid so as to approach each other.

Referring again to FIG. 5, in step S28, when the assembly unit 9 reaches the release position, the assemblies 30 are released in step S29. After that, it is determined whether to permit the termination of the operation of the robot 5. In the case of YES, the operation of the robot 5 is terminated (steps S30 and S31)

In the present disclosure, in order to assemble the first parts 31 and the second parts 32, the moving mechanism 19 of the assembly unit 9 of the robot 5 relatively moves the first holders 17 that hold the first parts 31 and the second holders 18 that hold the second parts 32. Thus, the first parts 31 and the second parts 32 can be removed and assembled with a simple configuration.

In the present disclosure, the positional relationship between the first parts 31 and the second parts 32 in the mold 21 is identified. Thus, the assembly unit 9 of the robot 5 simultaneously removes the first parts 31 and the second parts 32 from the mold 21 and then assembles the first parts 31 and the second parts 32 without releasing the parts. The created assemblies 30 are released at the release position.

Thus, the frequency of stopping the robot 5 and the like can be reduced during the assembling of the assemblies 30. For the same reason, a positioning mechanism for temporarily releasing and positioning the first parts 31 and the second parts 32 and a position sensor are not necessary. This can suppress costs for creating the assembly unit 9, the assembly system 1, and the like, achieving space savings. Moreover, the robot 5 assembles the removed first parts 31 and second parts 2 while transferring the parts to the release position, thereby reducing a cycle time.

In order to prevent disassembly of the assemblies 30, the first parts 31 and the second parts 32 are preferably snap-fitted to each other. For example, the parts may be snap-fitted when the second parts 32 are inserted to the bottoms of the recess parts 33 of the first parts 31.

Figure 7:
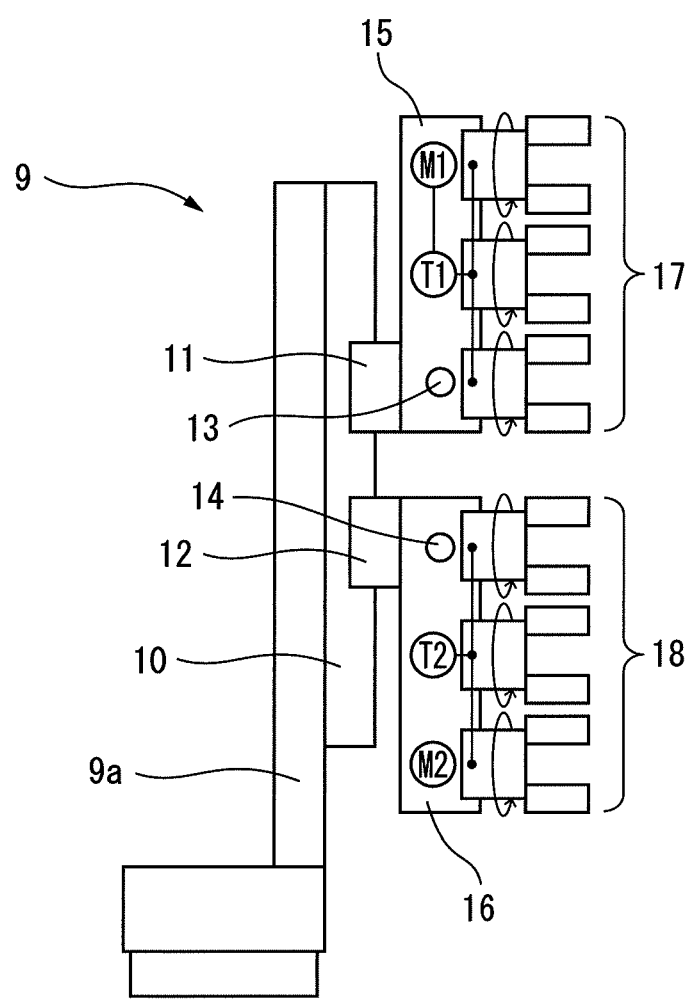
FIG. 7 is a top view of an assembly unit according to a second embodiment.

Alternatively, the second parts 32 inserted into the recess parts 33 of the first parts 31 may be rotationally snap-fitted. FIG. 7 is a top view showing an assembly unit according to a second embodiment. A first support part 15 on an assembly unit 9 in FIG. 7 includes a first motor M1 (first driving unit) and a first transmission unit T1. Similarly, a second support part 16 includes a second motor M2 (second driving unit) and a second transmission unit T2. The first transmission unit T1 and the second transmission unit T2 are, for example, gear sets.

A rotational motion from the output axis of the first motor M1 is transmitted to a plurality of first holders 17 through the first transmission unit T1, causing the first holders 17 to rotate around the axes of the first holders 17. Similarly, a rotational motion from the output axis of the second motor M2 is transmitted to a plurality of second holders 18 through the second transmission unit T2, causing the second holders 18 to rotate around the axes of the second holders 18. In other words, the first holders 17 and the second holders 18 are rotatable in a plane perpendicular to the assembling direction of the first parts 31 and the second parts 32.

In the use of the assembly unit 9 shown in FIG. 7, when the first parts 31 and the second parts 32 are assembled (step S27), at least one of the first motor M1 and the second motor M2 is driven to rotate at least one of the first holders 17 and the second holders 18. Thus, the rotating second parts 32 are inserted and snap-fitted into the recess parts 33 of the first parts 31. In this way, the assemblies 30 can be easily created without being disassembled. As a matter of course, only the second holders 18 may be rotated while excluding the first motor M1 and the first transmission unit T1.

In FIG. 4, the end faces, opposite to the end faces where the recess parts 33 are formed, of the first parts 31 held by the first mold 21 are exposed, and the portions, opposite to the portions engaged with the recess parts 33 of the second parts 32 are exposed. In another embodiment, the recess parts 33 of the first parts 31 held by the first mold 21 may be exposed and the portions, opposite to the portions engaged with the recess parts 33, of the second parts 32 may be exposed. In this case, another assembly unit 9 is used with a different configuration from FIG. 1 and the like.

FIGS. 8A to 8F show the states of another assembly unit. The assembly unit 9 in the drawings includes a first rail 10a disposed on an extended body 9a and a first rail sliding part 12a disposed so as to slide on the first rail 10a. The first rail sliding part 12a further includes a second rail 10b extending perpendicularly to the first rail 10a. A second rail sliding part 12b is disposed so as to slide on the second rail 10b. A second support part 16 is connected to the second rail sliding part 12b. A first support part 15 of the assembly unit 9 is fixed to the body 9a.

Figure 8A:
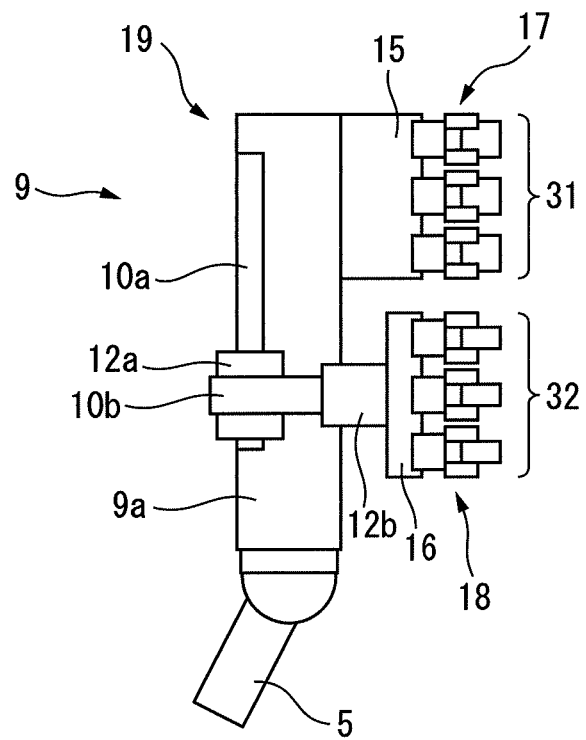
FIG. 8A shows a first state of another assembly unit.

The first support part 15 includes a plurality of first holders 17 similar to the foregoing first holders 17. The second support part 16 includes a plurality of second holders 18 similar to the foregoing second holders 18. The first holder 17 in FIGS. 8A to 8F has a hollow structure that allows a part of the second part 32 held by the second holder 18 to pass through the first holder 17. As shown in FIG. 8A, at least one of the first holders 17 and at least one of the second holders 18 are preferably arranged on the same straight line.

The assembly unit 9 in FIGS. 8A to 8F is mounted on the distal end of the robot 5. In step S24 of FIG. 4, the assembly unit 9 simultaneously removes the first parts 31 and the second parts 32 in the above-mentioned manner (FIG. 8A), and the assembly unit 9 then starts moving to a release position (step S25). While the assembly unit 9 moves to the release position, the assembly unit 9 moves the first parts 31 and the second parts 32 to an assembling position (step S26) and then assembles the parts (step S27).

Figure 8B:
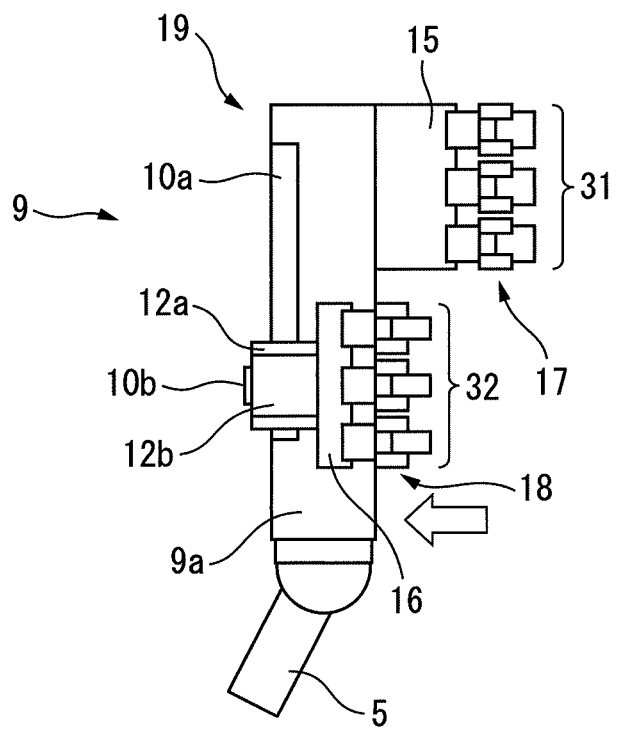
FIG. 8B shows a second state of another assembly unit.
Figure 8C:
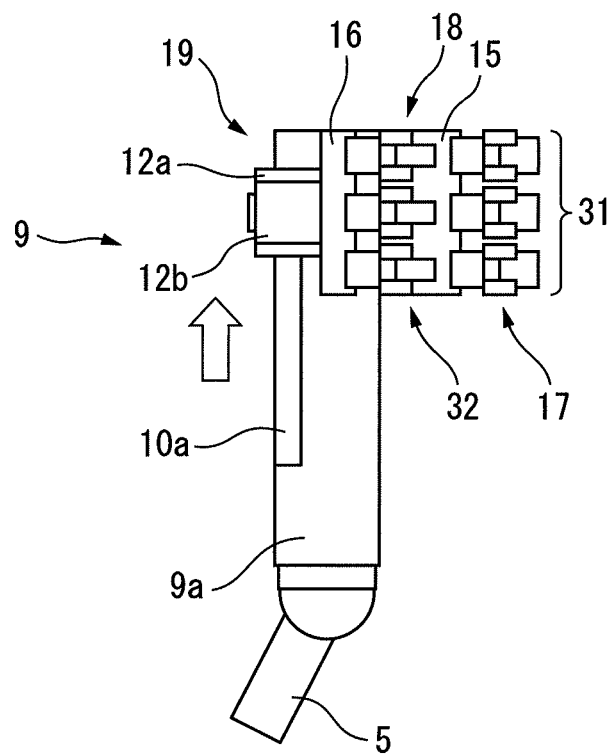
FIG. 8C shows a third state of another assembly unit.

Specifically, as shown in FIG. 8B, the second rail sliding part 12b slides on the second rail 10b in a closing direction. Subsequently, as shown in FIG. 8C, the first rail sliding part 12a slides on the first rail 10a until the second support part 16 reaches a position corresponding to the first support part 15. Thus, the first parts 31 held by the first holder 17 and the second parts 32 held by the second holder 18 face each other with the first holder 17 interposed between the first parts 31 and the second parts 32.

Figure 8D:
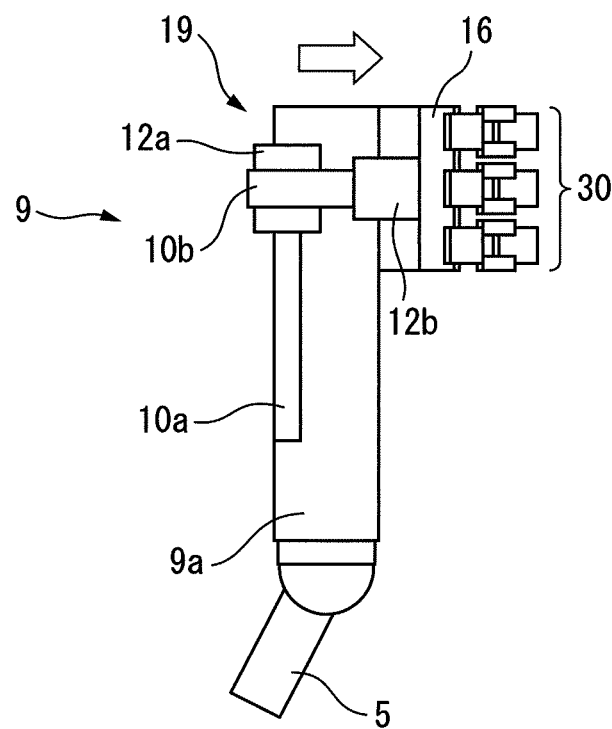
FIG. 8D shows a fourth state of another assembly unit.

Subsequently, as shown in FIG. 8D, the second rail sliding part 12b slides on the second rail 10b in a mold opening direction. This partially inserts the second parts 32 into the recess parts of the first parts 31 and assembles the first parts 31 and the second parts 32 so as to simultaneously create a plurality of assemblies 30. The second holders 18 are then opened so as to release the second parts 32.

Figure 8E:
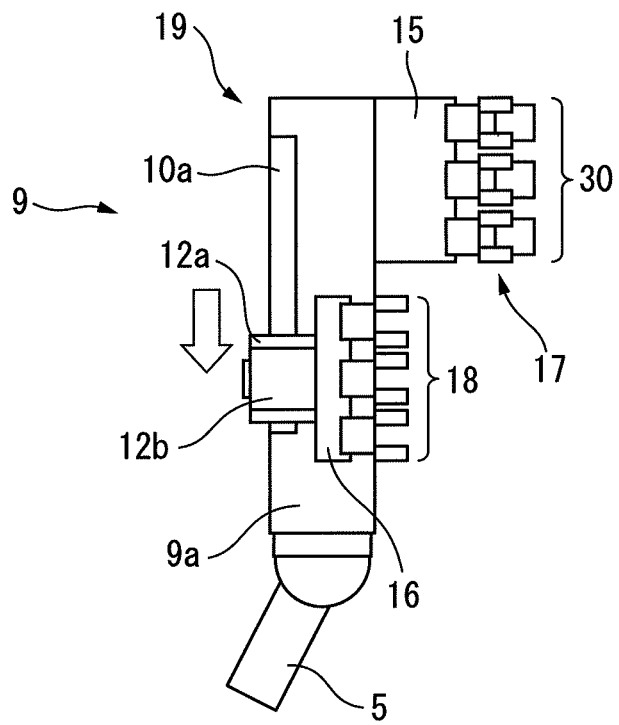
FIG. 8E shows a fifth state of another assembly unit.
Figure 8F:
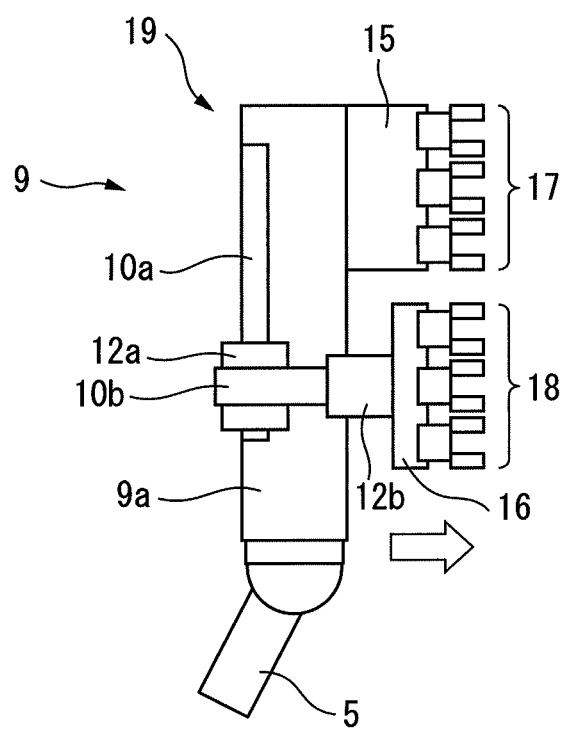
FIG. 8F shows a sixth state of another assembly unit.

As shown in FIG. 8E, the second rail sliding part 12b slides on the second rail 10b in a mold closing direction, and then the first rail sliding part 12a slides on the first rail 10a so as to be away from the first support part 15. Subsequently, as shown in FIG. 8F, the second rail sliding part 12b slides to an original position on the second rail 10b in a direction approaching the mold 21a.

In FIGS. 8A to 8F, the first rail 10a, the second rail 10b, the first rail sliding part 12a, the second rail sliding part 12b, and the second support part 16 act as the moving mechanism 19. The assembly unit 9 does not require the first rotating part 13 and the second rotating part 14, and the first support part 15 is fixed. Thus, the assembly unit 9 evidently has a smaller position error than the assembly unit 9 described with reference to FIG. 6A and the like.

In an embodiment (not shown), an assembly unit 9 may be moved between a standby position and a removal position, and a robot 5 may be replaced with a mobile object that can move the assembly unit 9 in a mold opening direction and a mold closing direction. Also in this case, the same effect can clearly be obtained.

Aspects of the Present Disclosure

A first aspect provides an assembly system including: a molding machine (25) that molds first parts (31) and second parts (32) in the same mold (21) so as to assemble the first parts and the second parts with each other; and a robot (5) that removes the first parts and the second parts from the mold after the first parts and the second parts are molded by the molding machine, and assembles the removed first parts and second parts without releasing the first parts and the second parts.

A second aspect provides, in the first aspect, an assembly system in which the robot has an assembly unit (9) including a first holder (17) holding the first parts and a second holder (18) holding the second parts, the first parts and the second parts that are molded by the molding machine are removed from the mold while being held by the first holder and the second holder of the robot, and at least one of the first holder and the second holder is moved relative to the other so as to assemble the first parts and the second parts without releasing the first parts held by the first holder and the second parts held by the second holder.

According to a third aspect, in the second aspect, the assembly system includes a driving unit (M1, M2) that rotates at least one of the first holder and the second holder in a plane perpendicular to the assembling direction of the first parts and the second parts.

A fourth aspect provides an assembling method including the steps of: molding first parts (31) and second parts (32) in the same mold (21) of the molding machine (25) so as to assemble the first parts (31) and the second parts (32) with each other; removing the first parts and the second parts from the mold by a robot (5); and assembling the removed first parts and second parts by the robot without releasing the first parts and the second parts.

A fifth aspect provides, in the fourth aspect, an assembling method further comprising the steps of holding the first parts by a first holder (17) provided in an assembly unit (9) included in the robot (5), holding the second parts by a second holder (18) provided in the assembly unit, moving the robot to remove the first parts and the second parts from the mold, and moving at least one of the first holder and the second holder relative to the other so as to assemble the first parts and the second parts without releasing the first parts held by the first holder and the second parts held by the second holder.

According to a sixth aspect, in the fifth aspect, further comprising the step of rotating at least one of the first holder and the second holder in a plane perpendicular to the assembling direction of the first parts and the second parts, when the first parts and the second parts are assembled.

A seventh aspect provides an assembly unit including a first holder (17) that holds first parts (31) molded in a mold (21) of a molding machine (25); a second holder (18) that holds second parts (32) molded with the first parts in the mold of the molding machine so as to be assembled to the first parts; and a moving mechanism (19) that relatively moves the first holder and the second holder so as to assemble the first parts and the second parts without releasing the first parts held by the first holder and the second parts held by the second holder.

The Advantageous Effects of the Aspects

In the first, second, fourth, and fifth aspects, the robot simultaneously removes the first parts and the second parts from the mold and assembles the first parts and the second parts without releasing the first parts and the second parts. Thus, the parts can be removed and assembled with a simple configuration. Furthermore, this configuration can eliminate the need for a positioning mechanism for positioning the first parts and the second parts and a position sensor, thereby reducing cost and the frequency of stopping the robot. Moreover, the robot can assemble the removed first parts and second parts while transferring the first parts and the second parts, thereby shortening cycle time.

In the third and sixth aspects, the first parts and the second parts can be easily snapped.

In the seventh aspect, the moving mechanism of the assembly unit relatively moves the first holder that holds the first parts and the second holder that holds the second parts so as to assemble the first parts and the second parts. Thus, the parts can be removed and assembled with a simple configuration.

The present invention was described according to the typical embodiments. A person skilled in the art could understand that the embodiments can be changed, and various other changes, omissions, and additions may be made without departing from the scope of the present invention.

The invention claimed is:

1. An assembly system comprising:
a molding machine that molds first parts and second parts in a same mold so as to assemble the first parts and the second parts with each other; and
a robot that removes the first parts and the second parts from the mold after the first parts and the second parts are molded by the molding machine, and assembles the removed first parts and second parts;
wherein the robot includes an assembly unit having a first holder that grips the first parts and a second holder that grips the second parts;
wherein the first parts and the second parts molded by the molding machine are held by the first holder and the second holder of the robot, respectively and removed from the mold; and
wherein the one of at least one of the first holder and the second holder is moved relative to the other, in such a manner the first parts held by the first holder and the second parts held by the second holder face each other, so that the first parts held by the first holder and the second parts held by the second holder are assembled with each other without releasing the first parts and the second parts from their respective first holder and second holder;
further comprising a driving unit (M1, M2) that rotates at least one of the first holder and the second holder in a plane perpendicular to an assembling direction of the first parts and the second parts.

2. The assembly system according to claim 1, wherein, when the first parts and the second parts are assembled, at least one of a rotating operation of the first holder holding the first parts and a rotating operation of the second holder holding the second parts, or at least one of a moving operation of the first holder holding the first parts in a closing direction of the mold and a moving operation of the second holder holding the second parts in the closing direction of the mold are conducted.

3. An assembling method comprising the steps of:
molding first parts and second parts in a same mold of a molding machine so as to assemble the first parts and the second parts with each other;
holding the first parts by a first holder of an assembly unit of a robot and holding the second parts by a second holder of the assembly unit;
moving the robot so as to remove the first parts and the second parts from the mold; and
moving the one of at least one of the first holder and the second holder relative to the other by rotation in a plane perpendicular to an assembling direction of the first parts and the second parts, in such a manner the first parts held by the first holder and the second parts held by the second holder face each other, so that the first parts held by the first holder and the second parts held by the second holder are assembled with each other without releasing the first parts and the second parts from their respective first holder and second holder.

4. The assembling method according to claim 3, wherein, when the first parts and the second parts are assembled, at least one of a rotating operation of the first holder holding the first parts and a rotating operation of the second holder holding the second parts, or at least one of a moving operation of the first holder holding the first parts in a closing direction of the mold and a moving operation of the second holder holding the second parts in the closing direction of the mold are conducted.

5. An assembly unit comprising:
a first holder that holds first parts molded in a mold of a molding machine;
a second holder that holds second parts molded with the first parts in the mold of the molding machine so as to be assembled with the first parts; and
a moving mechanism that relatively moves the first holder and the second holder so as to assemble the first parts and the second parts without releasing the first parts held by the first holder and the second parts held by the second holder; wherein
wherein the first parts and the second parts molded by the molding machine are held by the first holder and the second holder of the moving mechanism, respectively and removed from the mold; and
wherein the one of at least one of the first holder and the second holder is moved relative to the other, in such a manner the first parts held by the first holder and the second parts held by the second holder face each other, so that the first parts held by the first holder and the second parts held by the second holder are assembled with each other without releasing the first parts and the second parts from their respective first holder and second holder;
further comprising a driving unit (M1, M2) that rotates at least one of the first holder and the second holder in a plane perpendicular to an assembling direction of the first parts and the second parts.

6. The assembly unit according to claim 5, wherein, when the first parts and the second parts are assembled, at least one of a rotating operation of the first holder holding the first parts and a rotating operation of the second holder holding the second parts, or at least one of a moving operation of the first holder holding the first parts in a closing direction of the mold and a moving operation of the second holder holding the second parts in the closing direction of the mold are conducted.

* * * * *